US006242716B1

(12) United States Patent
Wang

(10) Patent No.: US 6,242,716 B1
(45) Date of Patent: Jun. 5, 2001

(54) RAPID ROASTING OVEN WITH MOVABLE HEATING ELEMENTS

(76) Inventor: Donglei Wang, No. 4 Workshop Building, Pinglanyuan Industrial Zone, Nanping Town, Zhuhai, Guangdong Province (519060) (CN)

( * ) Notice: Subject to any disclaimer, the term of this patent is extended or adjusted under 35 U.S.C. 154(b) by 0 days.

(21) Appl. No.: 09/538,986

(22) Filed: Mar. 30, 2000

(51) Int. Cl.[7] .......... A21B 1/14
(52) U.S. Cl. .......... 219/404; 219/405
(58) Field of Search .......... 219/404, 391, 219/409, 411, 405

(56) References Cited

U.S. PATENT DOCUMENTS

| | | | | |
|---|---|---|---|---|
| 2,984,730 | * | 5/1961 | Ostrom et al. | 219/404 |
| 3,281,575 | * | 10/1966 | Ferguson | 219/404 |
| 5,693,246 | * | 12/1997 | Han et al. | 219/404 |
| 5,938,959 | * | 8/1999 | Wang | 219/404 |
| 6,091,057 | * | 7/2000 | Asami et al. | 219/404 |

* cited by examiner

*Primary Examiner*—Joseph Pelham
(74) *Attorney, Agent, or Firm*—Foley & Lardner

(57) ABSTRACT

A rapid roasting oven with movable heating elements comprises a housing, a timer, a reflecting plate and at least one heating element mounted on the reflecting plate, wherein a travel mechanism is set in the housing, and the reflecting plate is coupled with the travel mechanism and moves up and down vertically along with the housing.

13 Claims, 5 Drawing Sheets

UPPER POSITION
LOWER POSITION
1
2
3
4
5
6
7
8
9
10
11
11a
12
13
14
15
16
17
18
20

UPPER POSITION
LOWER POSITION
1
2
3
4
5
6
7
8
9a
11a
11b
12
13
14
15
16
17
18
A

UPPER POSITION
LOWER POSITION
19
20
14
12
19

RAPID ROASTING OVEN WITH MOVABLE HEATING ELEMENTS

FIELD OF THE INVENTION

The present invention relates to a food processing facility, and more specifically to a rapid roasting oven.

BACKGROUND OF INVENTION

The roasting ovens commonly used and available in the market are fitted with stationary heating elements. For the convenience of roasting bulky pieces of food, the roasting rack is usually located on the bottom of the housing of the oven. However, the heating elements are far from the rack, the thermal efficiency is low and the power consumption is high.

SUMMARY OF THE INVENTION

Therefore, the object of the present invention is to provide a rapid roasting oven with movable heating elements. The oven is capable of controlling the distribution of the temperature and the roasting space by using a plurality of movable heating elements, thereby speeding up the heating, shortening the roasting time and increasing the thermal efficiency.

The rapid roasting oven with movable heating elements according to the present invention comprises a housing, a timer, a reflecting plate and at least one heating element mounted on the reflecting plate, wherein a travel mechanism is set in the housing, and the reflecting plate coupled with the travel mechanism can move up and down vertically in relation with the housing.

In one aspect of the invention, the travel mechanism is composed of a parallel four-bar linkage, a slidercrank device, and a tension spring, wherein one end of the parallel four-bar linkage is pivotally connected with one end of the reflecting plate, while the other end of the parallel four-bar linkage and one end of the slidercrank device are pivotally connected with a side wall of the housing, while the other end of the slidercrank device is mounted on the other side of the housing.

In another aspect of the invention, the travel mechanism is composed of a rocking arm, a pair of hopper chutes, a supporting shoe, a slidercrank device and a tension spring, wherein the hopper chutes are arranged along both side walls of the housing, the ends of the reflecting plate are fitted with the hopper chutes so that the reflecting plate can move up and down along the hopper chutes and, one end of the rocking arm is pivotally connected with the reflecting plate, while the other end is pivotally connected with the supporting shoe secured in the housing.

The rapid roasting oven according to the present invention makes it possible to control the distribution of the temperature as well as the roasting space, and thereby increases the heating velocity and the thermal efficiency, by using a plurality of movable heating elements. The cooking time of the invention is shorter than that of the conventional oven of the same power.

BRIEF DESCRIPTION OF THE DRAWINGS

These and other advantages of the present invention will become more apparent as illustrated in the following detailed description of the invention with reference to the accompanying drawings.

DETAILED DESCRIPTION OF THE INVENTION

Figure 1:
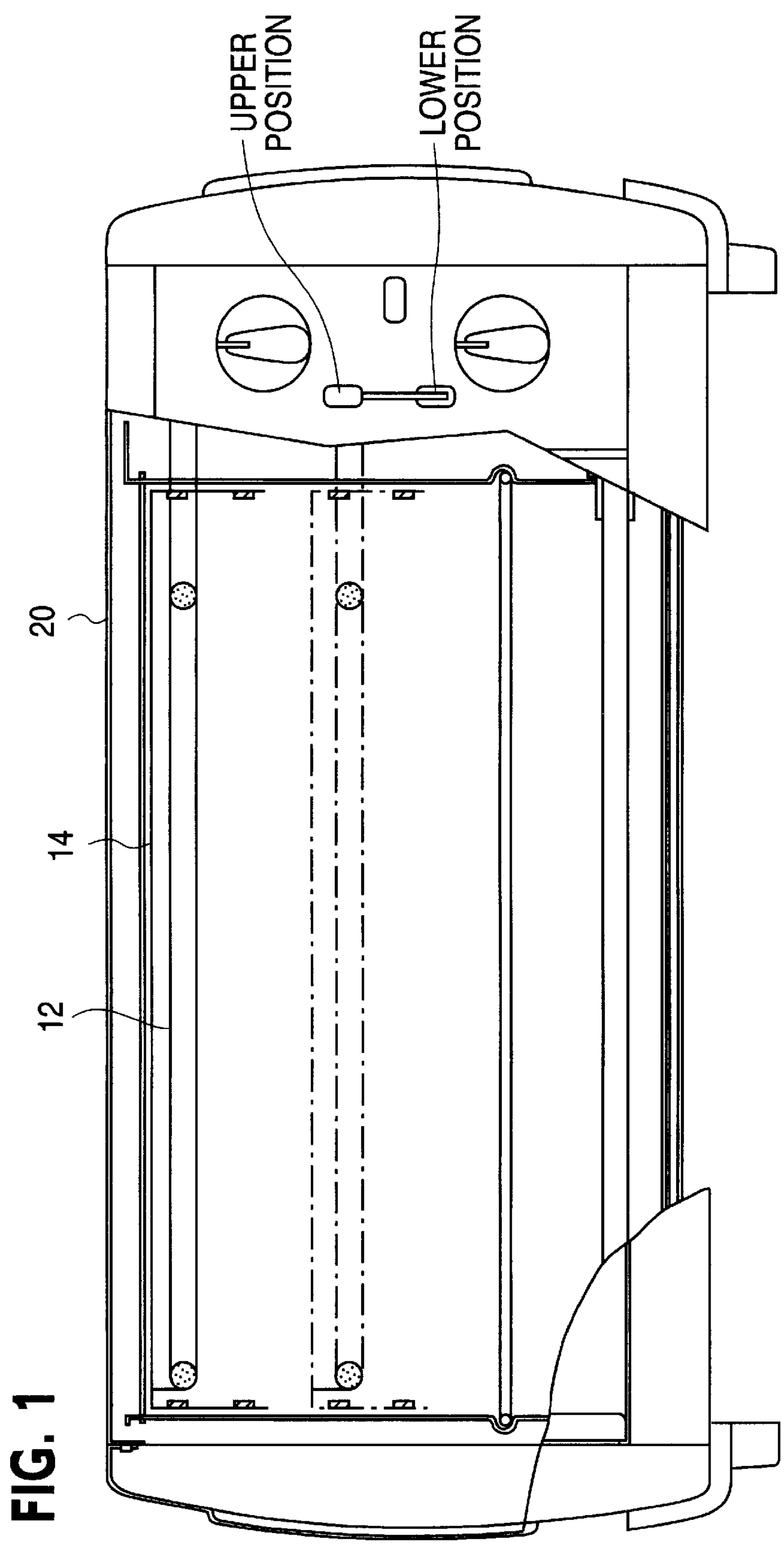
FIG. 1 is a structural diagram showing the rapid roasting oven with movable heating elements according to the invention.

The rapid roasting oven with movable heating elements according to the present invention comprises a housing 20, a timer, a reflecting plate 14 and at least one heating element mounted on the reflecting plate 14, wherein a travel mechanism is set in the housing 20, and the reflecting plate 14 coupled with the travel mechanism can move up and down vertically in relation with the housing 20.

In one aspect of the invention, the travel mechanism is composed of a parallel four-bar linkage, a slidercrank device, and a tension spring 7, wherein one end of the parallel four-bar linkage is pivotally connected with one end of the reflecting plate 14, while the other end of the parallel four-bar linkage and one end of the slidercrank device are pivotally connected with a side wall of the housing 20, while the other end of the slidercrank device is mounted on the other side of the housing 20. Alternatively, the parallel four-bar linkage is composed of a driving rack 9, a rocking arm 10, and a supporting shoe 8, wherein the driving rack 9 and the rocking arm 10 are strip-shaped, and one end thereof is pivotally connected with the reflecting plate 14 by using a rivet 11, while the other end is pivotally connected with the supporting shoe 8 which is secured on a side wall of the housing by using a rivet 11*a*.

In another aspect of the invention, the travel mechanism is composed of a rocking arm 9*a*, a pair of hopper chutes 19, a supporting shoe 8, a slidercrank device and a tension spring 7, wherein the hopper chutes 19 are arranged along both side walls 15 of the housing, the both ends of the reflecting plate 14 are fitted with the hopper chutes 19 so that the reflecting plate can move up and down along the hopper chutes 19 and, one end of the rocking arm 9*a* is pivotally connected with the reflecting plate 14, while the other end is pivotally connected with the supporting shoe 8 secured in the housing 20.

Figure 2:
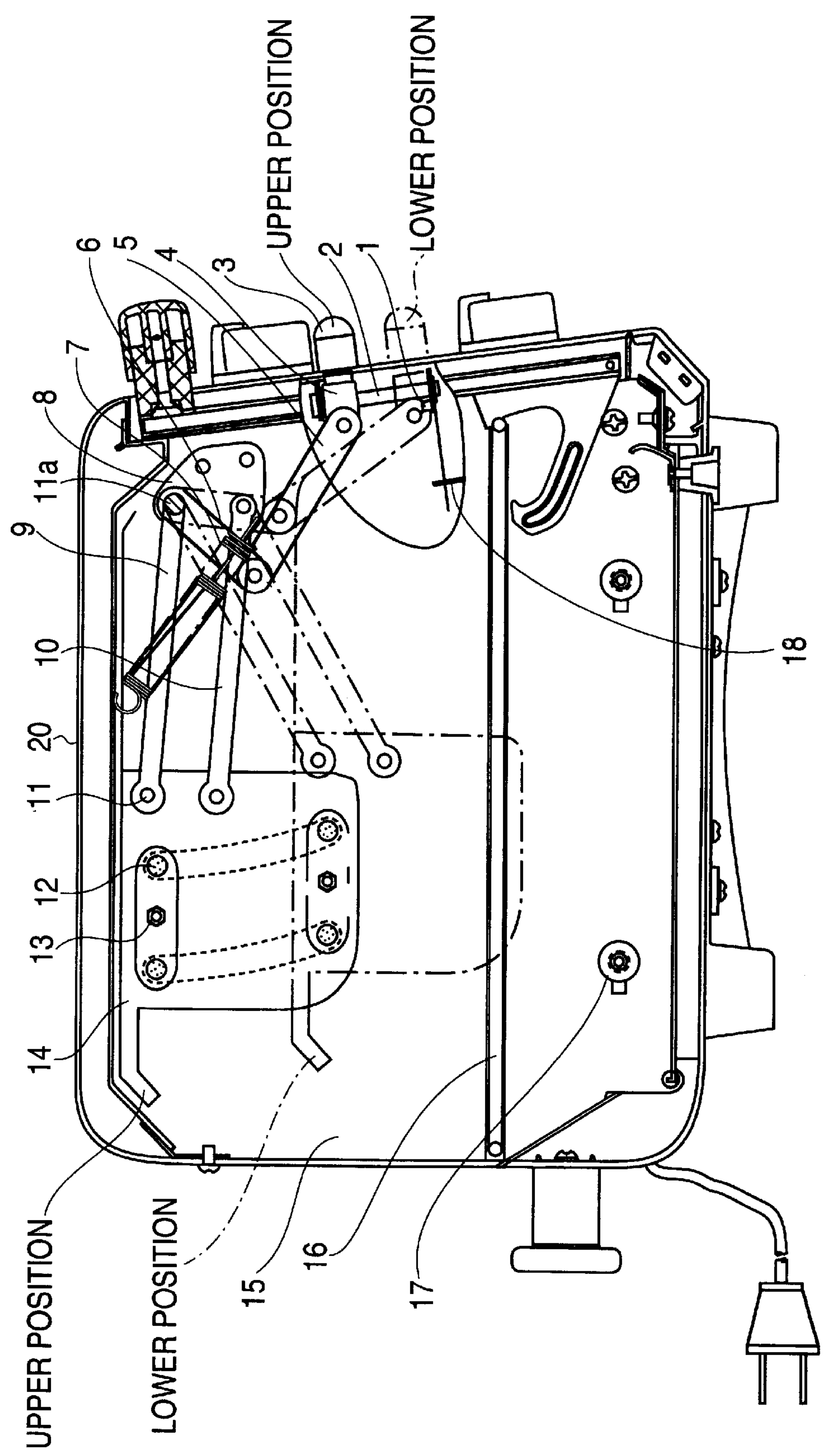
FIG. 2 is a structural diagram showing the rapid roasting oven with movable heating elements according to the first embodiment of the present invention.
Figure 3:
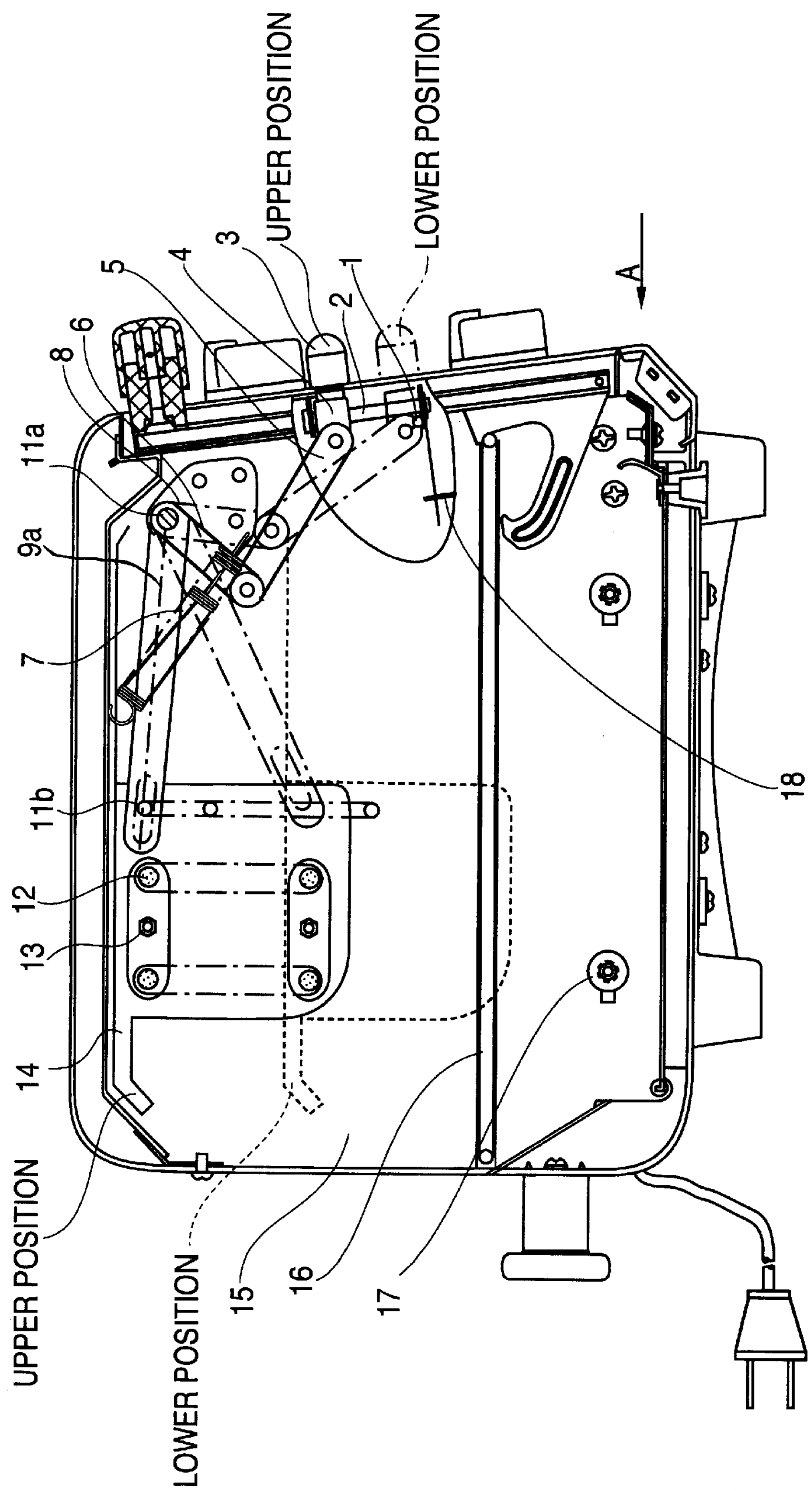
FIG. 3 is a structural diagram showing the rapid roasting oven with movable heating elements according to the second embodiment of the present invention.
Figure 4:
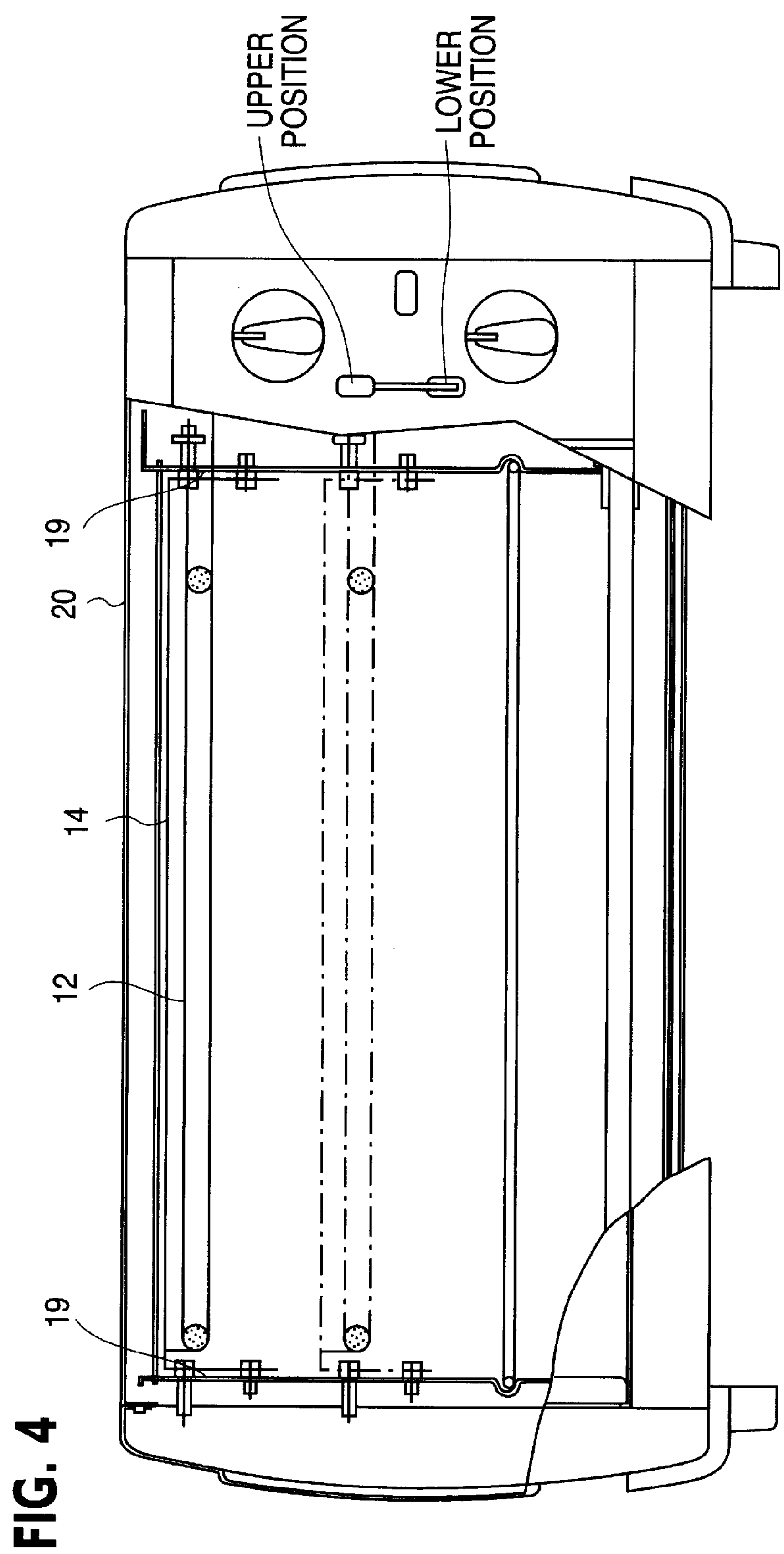
FIG. 4 is a structural diagram of the rapid roasting oven with movable heating elements, seen from the direction A in FIG. 3.

As shown in FIGS. 2 and 3, the slidercrank device is composed of a first connecting rod 5, a second connecting rod 6, a driving rod 4 and a guiding axle 2, whereas one end of the second connecting rod 6 is secured on the supporting shoe 8, while the other end of the second connecting rod 6 is pivotally connected with one end of the first connecting rod 5, and the other end of the first connecting rod 5 is pivotally connected with one end of the driving rod 4, while the other end of the driving rod 4 is capped on the guiding axle 2 and further connected with the handle 3, whereas the guiding axle 2 is secured on a side wall of the housing 20.

Preferably, the rapid roasting oven according to the present invention further includes a plurality of heating elements. One end of the tension spring 7 is connected with the second connecting rod 6, while the other end is secured on the top of the housing 20. The supporting shoe 8 is secured on the right sidewall of the housing 20. A hook 1 is arranged at the bottom of the guiding axle 2 and connected with a slice 18 of the timer.

In a preferred embodiment of the invention, the travel mechanism is composed of a parallel four-bar linkage, a slidercrank device, and a tension spring 7, as shown in FIG. 2. Whereas the parallel four-bar linkage is composed of a driving rack 9, a rocking arm 10, and a supporting shoe 8, the driving rack 9 and the rocking arm 10 are strip-shaped, and one end of the parallel four-bar linkage is pivotally connected with the reflecting plate 14 by using a rivet 11, while the other end is pivotally connected with the supporting shoe 8 which is secured on the right side wall of the housing 20 by using a rivet 11*a*. The slidercrank device is composed of a first connecting rod 5, a second connecting rod 6, a driving rod 4 and a guiding axle 2, wherein one end of the second connecting rod 6 and one end of the driving rack 9 are secured at a fixed point on the supporting shoe 8 can rotate around the fixed point. The other end of the second connecting rod 6 is pivotally connected with one end of the first connecting rod 5, and the other end of the first connecting rod 5 is pivotally connected with one end of the driving rod 4. The other end of the driving rod 4 is capped on the guiding axle 2 and further connected with the handle 3, whereas the guiding axle 2 is secured on a side wall of the housing 20. One end of the tension spring 7 is connected with the second connecting rod 6 of the slidercrank device, while the other end is secured on the top of the housing 20. The horizontal reflecting plate 14 is capable of moving vertically. The heating elements 12, fixed on the reflecting plate 14 by a screw member 13, can move up and down along with the reflecting plate 14.

The structure and the features of the embodiment can be well understood by those skilled in the art, with reference to the detailed explanation of the operation of the product.

Figure 5B:
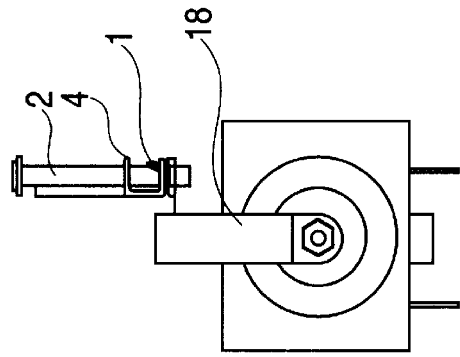
FIG. 5*b* is a left view of the driving rod in FIG. 5*a*.
Figure 5A:
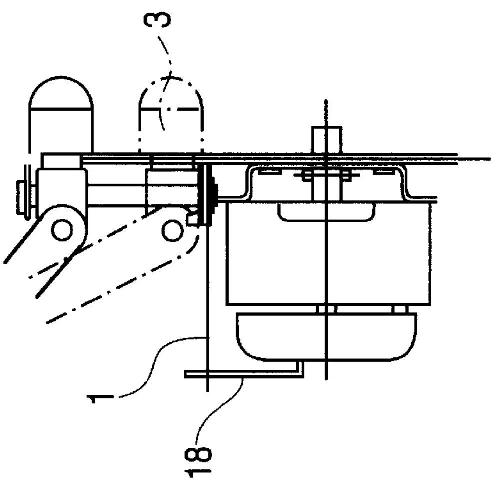
FIG. 5*a* is a sectional enlargement of the driving rod of the timer shown in FIG. 2 and 3.
Figure 5C:
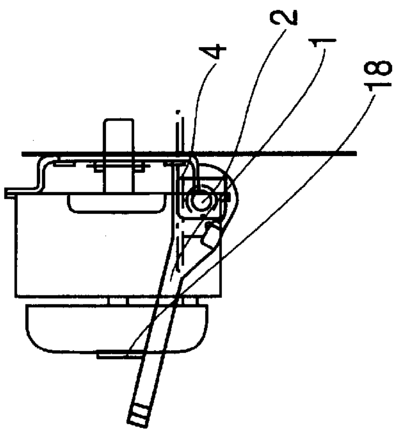
FIG. 5*c* is a top view of the driving rod in FIG. 5*a*.

First, place the food on the roasting rack 16 in the housing 20 and close the door. At this time, the reflecting plate 14 is in the upper position since the second rod 6 is under the tensile force produced by the tension spring 7. Second, start the timer and pull down the handle 3 simultaneously, so that the driving rod 4 which is connected with the handle 3 is moved along the guiding axle 2, and the first rod 5 and the second rod 6 are driven to rotate subsequently. The driving rack 9 is rotated along with the second rod 6, and the reflecting plate 14 as well as the heating elements 12 are moved downward to change the heating space, shorten the roasting time and increase the thermal efficiency. As shown in FIGS. 5*a*–5*c*, when the reflecting plate 14 and the upper heating elements 12 move to the lower position, the downward movement of the driving rod 4 is stopped by the hook 1 positioned at the bottom of the guiding axle 2. Since the slice 18 of the timer is connected with the hook 1, when the timer is returned to zero, the slice 18 disconnects the hook 1 from the driving rod 4, and the reflecting plate 14 is thus repositioned under the stress of the tension spring.

Alternatively, a lower heating element 17 can be fixed on the reflecting plate 14, thus moving the heating elements in the following three modes:

A. The movement of the upper heating element.

B. The movement of the lower heating element.

C. The movement of both the upper heating element and the lower heating element.

In the embodiment, the parallel four-bar linkage is used to keep the heating elements horizontal, while the slidercrank device is used for transmitting the movement from the handle to the reflecting plate, so as to have the heating elements move up and down. The reflecting plate is capable of reflecting the heat from the heating element to the food. The heating elements can be repositioned by means of the slice of the timer or a singlechip microcomputer. Similarly, the cooking time and cooking temperature can be controlled by timer, thermostat and menu converter or singlechip microcomputer.

In another preferred embodiment of the present invention, the travel mechanism is composed of a rocking arm 9*a,* a pair of hopper chutes 19, a supporting shoe 8, a slidercrank device and a tension spring 7. The hopper chutes 19 are arranged along both side walls of the housing 20, the two ends of the reflecting plate 14 are fitted in with the hopper chutes 19 so that the reflecting plate 14 can move up and down along the hopper chutes 19 and, one end of the rocking arm 9*a* is pivotally connected with the reflecting plate 14 via a supporting axle 11*b*. The other end of the rocking arm 9*a* is pivotally connected with the supporting shoe 8 secured in the housing 20 via a rivet 11*a*. Similar to the first embodiment, the slidercrank device is composed of a first connecting rod 5, a second connecting rod 6, a driving rod 4 and a guiding axle 2. One end of the second connecting rod 6 and one end of the rocking arm 9*a* are secured on the supporting shoe 8 at a fixed point and can rotate around the fixed point. One end of the tension spring 7 is connected with the second rod 6, while the other end is secured on the top of the housing 20. The reflecting plate 14 is fitted in with the hopper chutes 19 on both side walls 15 through the supporting axle 11*b*, so that the horizontal reflecting plate 14 can move vertically. The heating elements 12 are fixed on the reflecting plate 14 by a screw member 13 and can move up and down along with the reflecting plate 14.

When the handle 3 is pulled down, just as in the first embodiment, the driving rod 4 which is connected with the handle 3 is moved along the guiding axle 2, and the first rod 5, the second rod 6 and the rivet 11*a* are driven to rotate. The rocking arm 9*a* rotates along with the supporting axle 11*b* to make the reflecting plate 14 move downward along the hopper chutes 19 on both side walls 15. As a result, the heating elements 12 are moved downward, thereby changing the heating space, shortening the roasting time and increasing the thermal efficiency.

In another embodiment of the invention, the travel mechanism is driven by means of conventional apparatus, such as motor.

The foregoing embodiments are illustrative and not to limit the scope of the invention. On the contrary, it can be well understood to those skilled in the art that various modifications and substitutions can be made within the scope and the spirit of the appending claims.

What I claim is:

1. A rapid roasting oven with movable heating elements, comprising:

a housing;

a timer;

a reflecting plate; and at least one heating element mounted on the reflecting plate, wherein a travel mechanism is set in the housing, wherein the reflective plate is coupled with the travel mechanism and moves up and down in the vertical direction along the housing, wherein the travel mechanism is composed of a parallel four-bar linkage, a slidercrank device, and a tension spring, wherein one end of the parallel four-bar linkage is pivotally connected to the reflecting plate, wherein the other end of the parallel four-bar linkage and one end of the slidercrank device are pivotally connected to a side wall of the housing, and wherein the other end of the slidercrank device is mounted on the other side of the housing.

2. A rapid roasting oven with movable heating elements, comprising:

a housing;

a timer;

a reflecting plate; and at least one heating element mounted on the reflecting plate, wherein a travel mechanism is set in the housing, and the reflective plate is coupled with the travel mechanism and moves up and down in the vertical direction along the housing, wherein the travel mechanism is composed of a rocking arm, a pair of hopper chutes, a supporting shoe, a slidercrank device and a tension spring, wherein the hopper chutes are arranged along two side walls of the housing, wherein two ends of the reflecting plate are fitted in the the hopper chutes so that the reflecting plate moves up and down along the hopper chutes, and wherein one end of the rocking arm is pivotally connected to the reflecting plate, and wherein the other end of the rocking arm is pivotally connected to the supporting shoe which is secured in the housing.

3. A rapid roasting oven according to claim 1, wherein the parallel four-bar linkage is composed of a driving rack, a rocking arm, and a supporting shoe, wherein the driving rack and the rocking arm are strip-shaped and one end of each of the driving rack and rocking arm is pivotally connected to the reflecting plate by a rivet, and wherein the other ends of the driving rack and rocking arm are pivotally connected to the supporting shoe which is secured on the side wall of the housing by a rivet.

4. A rapid roasting oven according to claim 3, wherein the slidercrank device is composed of a first connecting rod, a second connecting rod, a driving rod and a guiding axle, wherein one end of the second connecting rod and one end of the driving rack are secured on the supporting shoe, wherein the other end of the second connecting rod is pivotally connected to one end of the first connecting rod, wherein the other end of the first connecting rod is pivotally connected to one end of the driving rod, wherein the other end of the driving rod is capped on the guiding axle and further connected to a handle, and wherein the guiding axle is secured on the side wall of the housing.

5. A rapid roasting oven according to claim 2, wherein the slidercrank device is composed of a first connecting rod, a second connecting rod, a driving rod and a guiding axle, wherein one end of the second connecting rod is secured on the supporting shoe, wherein the other end of the second connecting rod is pivotally connected to one end of the first connecting rod, wherein the other end of the first connecting rod is pivotally connected to one end of the driving rod, wherein the other end of the driving rod is capped on the guiding axle and further connected to a handle, and wherein the guiding axle is secured on one of the two side walls of the housing.

6. A rapid roasting oven according to claim 1, wherein one end of the tension spring is connected to the second connecting rod, and wherein the other end of the tension spring is secured on a top of the housing.

7. A rapid roasting oven according to claim 5, wherein one end of the tension spring is connected to the second connecting rod, and wherein the other end of the tension spring is secured on a top of the housing.

8. A rapid roasting oven according to claim 2, wherein the supporting shoe is secured on one of the two side walls of the housing.

9. A rapid roasting oven according to claim 1, further comprising:

a plurality of heating elements.

10. A rapid roasting oven according to claim 3, wherein a hook is arranged at a bottom of the guiding axle and is connected to a slice of the timer.

11. A rapid roasting oven according to claim 5, wherein a hook is arranged at a bottom of the guiding axle and is connected to a slice of the timer.

12. A rapid roasting oven according to claim 1, wherein the travel mechanism is driven by a motor.

13. A rapid roasting oven according to claim 2, wherein the travel mechanism is driven by a motor.

* * * * *